June 17, 1958   R. V. GOSS ET AL   2,838,829
METHOD OF MAKING BEARINGS
Filed Sept. 5, 1956

INVENTOR.
ROBERT W. LOWE.
ROBERT V. GOSS.
BY
Gustav Emery
ATTORNEY.

United States Patent Office

2,838,829
Patented June 17, 1958

2,838,829

METHOD OF MAKING BEARINGS

Robert V. Goss, Niles, Mich., and Robert W. Lowe, South Bend, Ind., assignors to Toefco Engineering Company, Niles, Mich., a corporation Application September 5, 1956, Serial No. 608,026

2 Claims. (Cl. 29—149.5)

This invention relates to porous metal elements and is particularly concerned with porous metal elements that are impregnated with a suitable lubricant material and to the method of making same.

One of the objects of the present invention is to provide a sintered porous metal element, such as a journal bearing, a bearing liner, a thrust washer or an anti-friction element, which has a completely sponge-like physical structure, comprising minute intercommunicating pores therein, said pores being substantially completely filled with a lubricant material, such as polytetrafluoroethylene.

Another object of the invention is to provide a sintered porous element having a completely sponge-like physical structure, comprising minute intercommunicating pores therein, said pores mechanically holding, and being substantially completely filled with, a semi-solid lubricant material so as to provide a lubricated surface on the element.

An important object of our invention is to provide a method of effecting a penetration of polytetrafluoroethylene or its equivalent into all or substantially all of the porous structure of a bearing after said bearing has been previously sintered, the bearing so filled then, but not until then, first heated to volatilize all liquids, then sintered, and lastly coined to its final shape and state.

Yet another important object of our invention is to provide a bearing of metal and polytetrafluoroethylene or its equivalent, so formed that the polytetrafluoroethylene may, when in use, expand to maintain at all times a film of polytetrafluoroethylene on the surface of the bearing; accordingly it is an object of our invention to provide a self healing bearing whereby with the bearing in use, should the aforementioned film of polytetrafluoroethylene be worn off at a certain spot to thereby permit a metal to metal contact, then the immediate increased operating temperature at this spot will cause expansion of the polytetrafluoroethylene in the bearing thereby reforming the film of polytetrafluoroethylene at said spot.

It is known that polytetrafluoroethylene possesses good anti-friction properties for use with steel or other journal materials and that it retains these properties in the absence of an intermediate separating film of oil or other lubricant, and at temperatures up to about 280° C.

However, polytetrafluoroethylene has three disadvantages. In the first place, it possesses a high coefficient of thermal expansion which, on any substantial variation in temperature, will change the clearance between the bearing and journal or thrust face to cause excessive looseness when cooled again to atmospheric temperature. In the second place, it possesses low heat conductivity with the result that the surface layers of a bearing are liable to overheat above the transition temperature, 327° C. In the third place it possesses poor mechanical strength.

It is an important object of our invention to utilize the good antifriction properties of the polytetrafluoroethylene when used in a bearing and to capitalize upon the first two of the aforementioned three bad properties in effecting the above discussed ever present film of polytetrafluoroethylene on the bearing surface; accordingly in final effect the disadvantages of relatively high coefficient of thermal expansion and relatively low heat conductivity of the polytetrafluoroethylene are avoided.

Further objects and advantages of the present invention will be apparent from the following description, reference being had to the accompanying drawing within which a preferred embodiment of the present invention is clearly shown.

Figure 1:
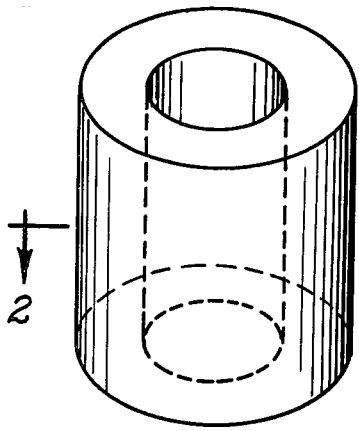
Figure 1 is a view disclosing a tubular shaped mass of metal particles closely approximating in shape the finished shape of the bearing of our invention, said mass disclosing the bearing after the completion of the second step of said invention.

To carry out the several steps of our invention a dry, clean, metallic powder is selected; one suitable for the thermal, physical and chemical conditions necessary to effect the process, and the desired article resulting from said process. We prefer to employ a metallic powder of bronze of a grain size capable of passing through 100 mesh screen and of a size facilitating the impregnation therein of a desired amount of a semi-solid element, preferably polytetrafluoroethylene. However, the comminuted metal to be used may be any one of aluminum, aluminum alloy, bronze, iron, iron alloy, or stainless steel. The granules of the metal powder are indicated by the reference numeral 8 in Figures 2, 4 and 5 of the drawings.

The first step of our invention constitutes the compressing, by means such as a suitable die and at a pressure of, say 2,000 p. s. i., of the aforementioned metallic powder to its approximate finished shape, preferably a tubular shaped bearing member of the shape disclosed in Figure 1; and in this operation the compacting pressure resulting in this blank is controlled to effect the desired porosity of the partly finished bearing of Figure 1. For example the porosity of the blank resulting from this first step may be, say 35% of the volume of the whole, and preferably no less than this amount.

Figure 2:
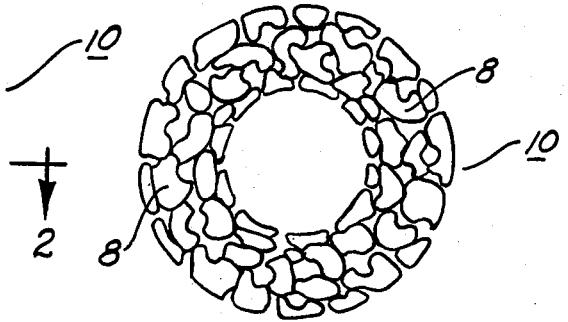
Figure 2 is a sectional view, taken on the line 2—2 of Figure 1, disclosing the approximate arrangement of the metal granules of the bearing after the first sintering operation, that is the aforementioned second step of the process of our invention.

The second step of our invention lies in sintering the aforementioned blank to form the tubular shaped porous metallic structure disclosed in Figures 1 and 2, the resulting product being indicated by the reference numeral 10. By suitable control of the temperature, the powder grain size shape, and the time of sintering, a porous structure with predetermined pore size and volume can be obtained.

As to the next step in our process the sintered blank 10 of Figure 1 is then impregnated with a semi-solid material, preferably polytetrafluoroethylene of the desired viscosity and other physical and chemical characteristics. This impregnation may be effected by several different means however we prefer to employ the apparatus disclosed in Figure 3 of the drawings. This apparatus includes a glass bell jar 12 of suitable size and shape resting upon a platform 14. A glass beaker 16, placed upon the platform and covered by the jar, serves as a container for a dispersant fluid or so called vehicle 18, preferably of water and a wetting agent such as Triton X-100; and this fluid preferably holds in suspension minute particles of polytetrafluoroethylene indicated by the reference numeral 20. The polytetrafluoroethylene of this emulsion may be present in the amount of, say, 48 to 60% by volume and the remainder of the emulsion is made up of water and the wetting agent.

Figure 3:
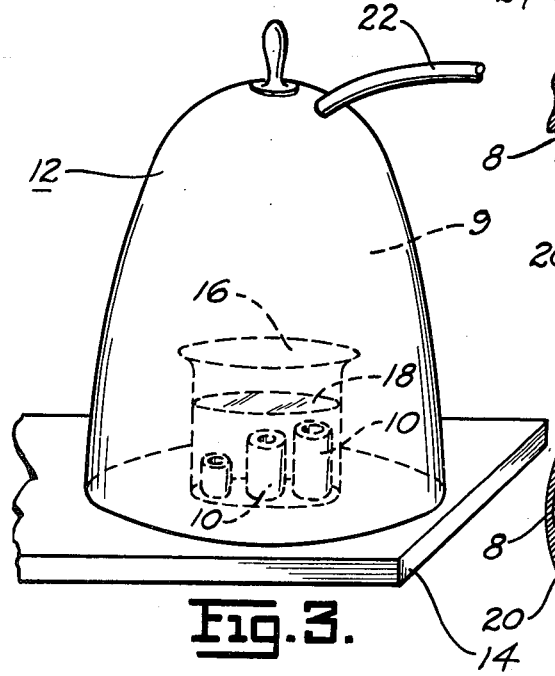
Figure 3 is a view disclosing the bearing of our invention housed within a bell jar preparatory to effecting one of the important steps of our invention.

As disclosed in Figure 3 a plurality of the sintered bearing blanks 10 are then immersed in the polytetrafluoroethylene, water and wetting agent emulsion whereupon the polytetrafluoroethylene is then drawn into all or substantially all of the interstices of the bearing blanks. The latter operation is facilitated by partially evacuating the space 9 in the jar above the surface of the emulsion; and this operation may be effected by means of a flexible tube 22 connected with a vacuum pump or other source of vacuum, not shown. Explaining this operation the air in the voids between the particles of metal, Figure 2 is of less density than the emulsion and the absolute pressure of said air is greater than the absolute pressure of the air remaining in the space 9 above the emulsion after said space has been partially evacuated; with the result that with the evacuation of the bell jar the air entrapped in the bearing is displaced by the emulsion, said air, in bubble form, moving up through the emulsion and into the partially evacuated space 9 above said emulsion.

If desired, all or a substantial portion of the outer layer of the body of the bearing blanks 10 may be impregnated with the polytetrafluoroethylene by temporarily sealing off the ends of each blank, then immersing the said blanks in the aforementioned emulsion, and lastly evacuating the interior of said blanks; or if it is desired to impregnate the innermost layer of the blanks then one end of each blank is temporarily sealed, the blanks are then filled with the emulsion, the other ends of the blanks are then sealed, and lastly the atmosphere enveloping the blanks is partially evacuated to the desired degree of vacuum.

Describing the next step of our process the bearing blanks 10 are then heated to a temperature of, say 150° F. to thoroughly volatilize the vehicle of the emulsion, that is the wetting agent and the water. In this operation the time and temperature factors must be controlled so as not to boil the dispersant liquid; for to do so would probably chemically change and disturb the distribution of the polytetrafluoroethylene remaining in the voids between the particles of metal 8.

Figure 4:
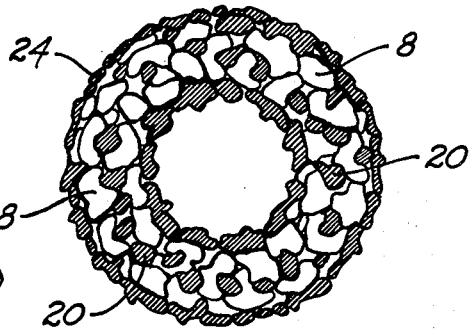
Figure 4 is a sectional view disclosing the approximate arrangement of the polytetrafluoroethylene and metal constituents of the bearing after the second sintering step of our invention.
Figure 5:
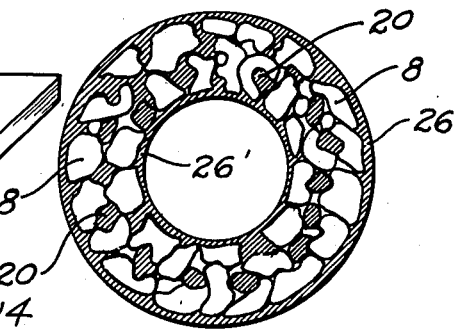
Figure 5 is a sectional view disclosing the bearing constituents after effecting the final, that is, coining step of our invention.

Describing now the next step of the process constituting our invention the blanks 10, now completely or substantially completely soaked up as it were with the viscous particles of polytetrafluoroethylene, are sintered, the rather easily compressible and distortable particles of polytetrafluoroethylene by this sintering operation assuming substantially the shape and arrangement disclosed in Figure 4 of the drawings. It is to be noted from an inspection of Figure 4, that the outer and inner peripheries of the bearing blank is covered with a very thin film 24 of polytetrafluoroethylene. The sintering temperature preferably should not exceed a temperature of, say, 400° C.; for this temperature would disassociate, that is chemically change the polytetrafluoroethylene. After this sintering or baking step the voids of the blanks are preferably 10 to 15% of the whole.

The last step of the process of our invention lies in the coining of the bearing blank or work piece to its final shape. A cross section of the final product is disclosed in Figure 5, the voids being reduced to, say 3 to 5% of the whole. The metal and polytetrafluoroethylene are, respectively, now approximately 35% and 65% by volume although this may be varied to suit the requirements of the bearing. For example the stresses and strains and the shearing actions to which the bearing is subjected will determine the metal content thereof. In this compressing or so called coining operation, preferably effected by a suitable die and at a suitable pressure of, say 1000 pounds above the yield point of Bronze the viscous polytetrafluoroethylene is distorted to more completely fill the interstices of the bearing and, as is disclosed in Figure 5, there remains a relatively thin film of polytetrafluoroethylene on the outer and inner peripheries of the bearing. This film, indicated by the reference numerals 26 and 26' in Figure 5, may be, say, approximately .0002" in thickness. The forming of the relatively thin film of polytetrafluoroethylene on the surfaces of the bearing may be defined as a smearing operation and the presence of this film, which may be called a starting film, tends to reduce friction without building up the thickness to a point where hot or cold flow will be detrimental.

There is thus provided, by our invention, an improved bearing which is adapted for effective operation without the use, or in the temporary absence, of an intermediate separating film of oil or other lubricant. The excellent oil like anti-friction and the foreign matter repellant and noncorrosive qualities of the polytetrafluoroethylene make it well suited for use in bearing materials and the polytetrafluoroethylene retains these properties in the absence of an intermediate separating film of oil or other lubricant, and at a temperature up to about 300° C. It is to be particularly noted that the heretofore described six step process of our invention may be employed to produce products other than the tubular shaped bearing disclosed in the drawing and heretofore described in this specification; for example our process invention may be utilized to produce a thrust washer.

One of the important features of our invention lies in the fact that by the particular process set forth above a product is produced in which the poor heat conductivity and high coefficient of expansion, bad features of polytetrafluoroethylene, are put to good use; for when the bearing 10 is in use and a hot spot is developed, the polytetrafluoroethylene therein, due to its relatively low heat conductivity and relatively high thermal expansion, will heat up quickly and when so doing will expand thereby providing a sufficient excess of polytetrafluoroethylene at the hot spot to prevent a deleterious metal to metal contact of the relatively movable working parts of the journal and bearing. For all normal usage of the polytetrafluoroethylene impregnated bearing of our invention the continuous matrix will serve to prevent an overheating of the bearing; for the granules of metal of said bearing are, in the finished product of Figure 5, preferably in contact with each other providing a continuity of metal from the inside surface to the outside surface of the bearing.

Another feature of our invention lies in the placement of the polytetrafluoroethylene, or its equivalent into the bearing before full compaction of the sintered metal mass thereby insuring a proper impregnation of said polytetrafluoroethylene; and another feature of our invention lies in the complete or substantially complete distribution of the polytetrafluoroethylene throughout the entire bearing or other work piece being made.

Although a particular embodiment of our invention has been described, it will be understood by those skilled in the art that the objects of the invention may be attained by the use of constructions different in certain respects from that disclosed without departing from the underlying principles of the invention. We therefore desire by the following claims, to include within the scope of our invention all such variations and modifications by which substantially the results of our invention may be obtained through the use of substantially the same or equivalent means.

We claim:
1. A process of producing a product having a surface characterized by its relatively high anti-friction quality, said process comprising the successive steps of forming a blank of comminuted metal, sintering said blank to effect the desired characteristics including porosity of structure, impregnating said sintered blank with an emulsion including a vehicle and polytetrafluoroethylene in suspension therein, heating said blank at a temperature of approximately 150° F. to evaporate the vehicle, heating said blank at a temperature not to exceed 400° C. to sinter the polytetrafluoroethylene, and lastly coining the polytetrafluoroethylene impregnated blank to provide the desired finished product having the desired shape and surface characteristics.

2. A process according to claim 1, in which the step of impregnating the blank is effected by temporarily sealing off one end of the blank, then filling the interior thereof with the said emulsion, then temporarily sealing off the other end of the blank, and then partially evacuating the atmosphere enveloping the blank.

References Cited in the file of this patent

UNITED STATES PATENTS

| | | |
|---|---|---|
| 2,299,877 | Calkins | Oct. 27, 1942 |
| 2,365,562 | Koehring | Dec. 19, 1944 |
| 2,390,160 | Marvin | Dec. 4, 1945 |

FOREIGN PATENTS

| | | |
|---|---|---|
| 711,620 | Great Britain | July 7, 1954 |